United States Patent [19]

Le et al.

[11] 4,407,516

[45] Oct. 4, 1983

[54] PRESSURE ENERGIZED SEALING CONNECTION WITH ANNULAR SEAL RING

[75] Inventors: Tri C. Le; Bruce P. Noble, both of Houston, Tex.

[73] Assignee: ACF Industries, Incorporated, New York, N.Y.

[21] Appl. No.: 449,353

[22] Filed: Dec. 13, 1982

[51] Int. Cl.³ .............................................. F16J 15/06
[52] U.S. Cl. ................................ 277/206 R; 277/208; 277/212 C; 277/236; 277/27
[58] Field of Search ................. 277/3, 27, 12, 32, 205, 277/206 R, 207 R, 208, 212 R, 212 C, 236

[56] References Cited

U.S. PATENT DOCUMENTS

| | | | |
|---|---|---|---|
| 2,895,773 | 7/1959 | McConnaughey | 277/208 X |
| 3,175,833 | 3/1965 | Morse | 277/206 X |
| 3,298,719 | 1/1967 | Bills et al. | 277/236 X |
| 3,323,805 | 6/1967 | Legarra | 277/236 X |
| 3,458,220 | 7/1969 | Rose et al. | 277/236 X |

FOREIGN PATENT DOCUMENTS 1957650  5/1971  Fed. Rep. of Germany ...... 277/206

Primary Examiner—Robert S. Ward, Jr.
Attorney, Agent, or Firm—Marvin J. Marnock

[57] ABSTRACT

A pressure energizable sealing connection for establishing a bore seal between first and second coaxially aligned and connected members (22, 10) having opposed internal recesses forming seat pockets at their adjoining ends. The invention comprises a sealing ring (40) having annular end surfaces (56, 54) and an internal diameter which corresponds to the bores of the coaxially aligned members (22, 10), the connection of which is to be sealed. The ring (40) is provided with a pair of circumferential projections (67, 68) separated by a groove (69) therebetween and each having an external surface of arcuate configuration. At their adjoining ends (25, 26) the opposed seat pockets of the adjoining members (22, 10) provide annular cylindrical walls (41, 42) for sealing engagement with the annular projections (67, 68) of the sealing ring (40). The external diameter of the ring (40) is slightly larger than the diameters of the seat pockets so that the resulting interference fit between the ring (40) and the cylindrical walls (41, 42) of the seat pockets provides an initial seal between the projections of the ring (40) and the coaxially connected members (22, 10). The axial dimension of the ring equals the sum of the axial dimensions of the seat pockets so there is no axial compression of the ring by the connected members (22, 10). Fluid pressurization of the coaxially adjoined members results in pressure energization of the sealing ring so that any increase in pressure internally of the connected members results in a greater radial compression of the sealing ring and correspondingly greater sealing forces.

9 Claims, 3 Drawing Figures

PRESSURE ENERGIZED SEALING CONNECTION WITH ANNULAR SEAL RING

BACKGROUND OF THE INVENTION

This invention relates to pressure energized sealing connections and more particularly to a bore seal comprising an annular sealing ring for sealing between first and second coaxially aligned members.

With bore seals for connectors, the sealing may be achieved by crushing the sealing element or by elastically loading a flexible sealing element which utilizes a soft coating or plating on the seal surface. The seals, in some instances, are pressure energized as determined by their design and relationship with the elements to be connected. Under conditions of high pressure and high temperatures, most conventional bore seals undergo severe permanent deformation which impairs their reuseability. They most often require considerable gasket loading and axial compression which is necessarily associated with larger heavier bolts and a larger, more expensive connection. In many instances, the provision of sealing surfaces requires expensive manufacturing procedures and assembly of the connection requires installation and replacement procedures. They are also typically formed with many angular surfaces and corners which under loading are areas of heavy stress concentration thereby leading to surface cracking and fractures and seal failure. Further, a great many bore seals lack the capability of providing for effective sealing over a wide range of fluid pressures and operating temperatures.

An object of the present invention is the provision of a pressure energized bore seal which does not exhibit abnormally high stress concentrations under loading as would lead to surface cracking and seal failure and which is adapted to provide effective sealing of a joint in a range from substantially zero pressure to as high as 45,000 p.s.i.

Another object is to provide a bore seal for sealing between first and second coaxially aligned members which does not require gasket loading or the axial compression of a sealing element.

A further object is to provide a bore seal which is effective for sealing over an extremely wide range of fluid pressures and yet is simple to manufacture and install or replace.

A still further object is to provide a bore seal which comprises a unique annular sealing ring for sealing between first and second coaxially aligned members over wide range of operating pressures and has a high degree of reliability and reuseability.

The invention comprises a sealing ring having annular end surfaces at opposite ends thereof and an internal diameter which corresponds to the bores of first and second coaxially aligned members, the connection of which is to be sealed. The ring is provided on its outer periphery with a pair of circumferential projections separated by a channel or groove therebetween. At their adjoining ends, the coaxially aligned members are provided with opposed seat pockets which provide annular cylindrical walls for sealing engagement with the annular projections of the sealing ring. The external diameter of the ring is slightly larger than the diameters of the seat pockets so that the resulting interference fit between the ring and the cylindrical walls of the seat pocket provides an initial seal between the pair or projections of the ring and the first and second coaxially adjoined members. The axial dimension of the ring is slightly less than the total axial dimensions of the seat pockets so there is no axial compression of the ring by the coaxial adjoined members. Fluid pressurization of the coaxially adjoined members results in pressure energization of the sealing ring so that any increase in pressure internally of the connected members results in a greater radial compression of the sealing ring and correspondingly greater sealing forces.

DESCRIPTION OF A PREFERRED EMBODIMENT

Figure 1:
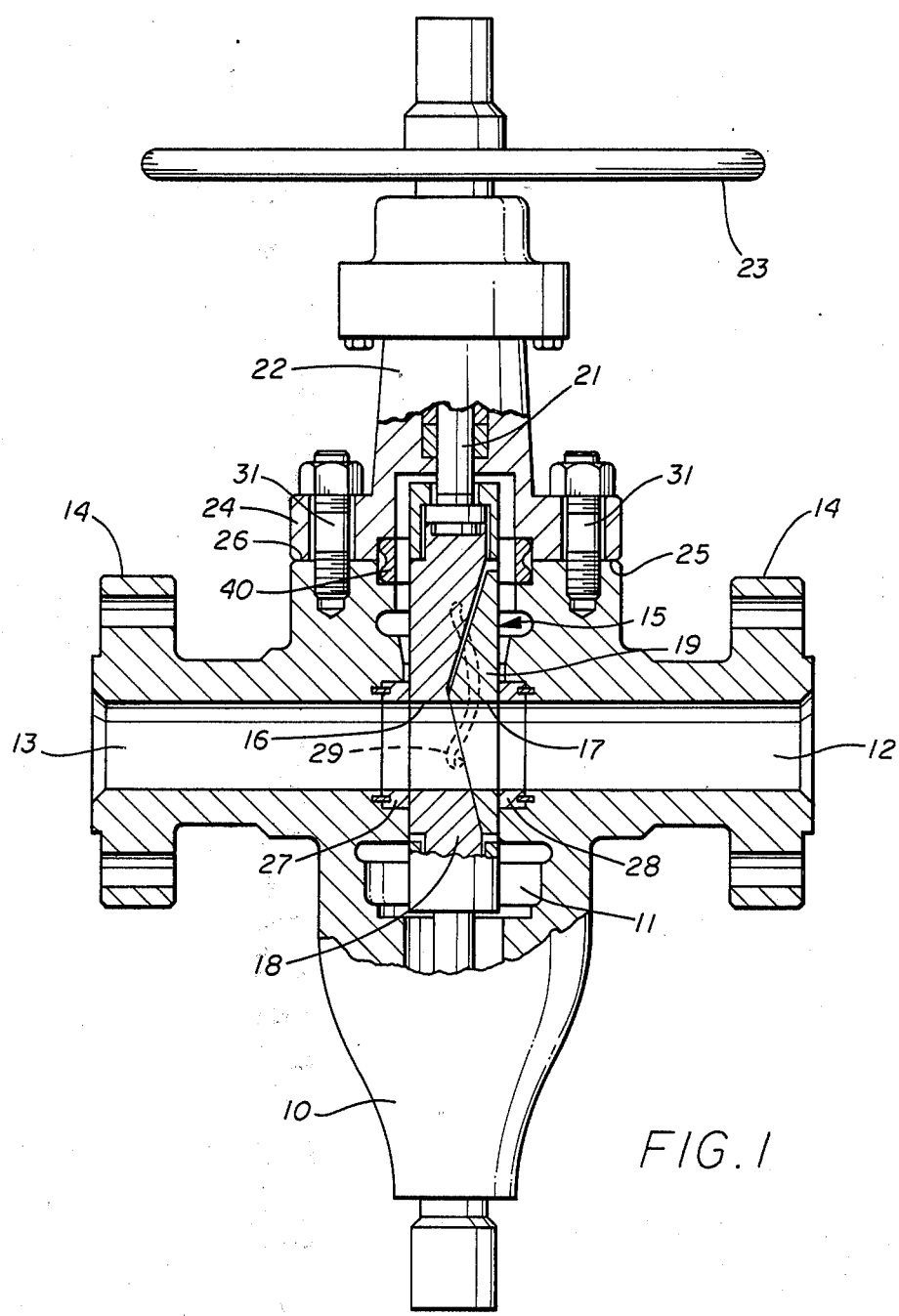
FIG. 1 is a sectional view of an expansible gate valve with the upper portion of the valve shown in elevation and utilizing an annular seal member in accordance with a preferred embodiment of the invention for effecting a fluid-tight seal between the valve bonnet and the valve body.

Referring to the drawings in greater detail, the invention is illustrated herein in connection with a gate valve which utilizes the principle of parallel expanding gates for obtaining a positive mechanical seal on the upstream and downstream sides of the gate assembly. The valve in FIG. 1 which illustrates a typical application of the high pressure sealing connection of this invention includes a valve body 10 provided with a valve chamber 11 and inlet and outlet flow passages 12 and 13 which are in fluid communication with the valve chamber 11 to form a flow way through the valve. Flanges 14 at the ends of the valve body provide means for connecting the valve in a flowline.

Within the valve chamber 11 a gate assembly 15 is mounted for sliding movement transversely of the flow passages to open or close the flow way. The gate assembly 15 comprises a gate member 18 and a segment 19. The gate member 18 is connected at its upper end to a valve stem 21 which extends through the valve bonnet 22 which is bolted atop the valve body 10 and closes the upper end of the valve chamber 11. At its upper end the stem 21 is provided with a valve actuating handwheel 23. The valve shown is of the rising stem type and the stem 21 is connected to the gate member 18 so that upon rotation of the handwheel and the stem the gate assembly is prevented from rotation but is movable across the flow way to open or close the valve. In the valve open position, ports 16, 17 in the gate and segment members, respectively, are aligned in registry with the inlet and outlet passages 12 and 13.

As is typical of expansible gate assemblies, the gate member 18 is provided with a V-shaped recess which accommodates the wedge shaped segment 19, the wedge faces of which conform to the surfaces of the V-shaped recess and are in contact therewith. Also, characteristically, the linear movement of the gate assembly to open or close the valve causes an expansion of the gate assembly in both its open and closed positions due to relative sliding movement between the gate and segment members 18 and 19 as induced by suitable stops (not shown) in the valve chamber 11 for limiting the vertical movement of the segment 19 relative to the gate 18. When in expanded condition, the gate assembly seals against seat rings 27 and 28 mounted in annular recesses which surround the flow passages 12 and 13 and open to the valve chamber 11. The gate assembly 15 is also provided with a biasing means such as a pair of bow springs 29 which are fixed to the sides of the gate assembly and bias the gate assembly towards a collapsed condition wherein the segment member 19 is nested in the V-shaped recess of the gate member 18.

Accordingly, when in transit between the open and closed positions the gate assembly 15 is in collapsed contracted condition and the valve chamber 11 is exposed to the flowline pressure.

It is also seen that the bonnet 22 is secured to the valve body by a plurality of studs or bolts 31 which pass through a radial flange 24 on the lower end of the bonnet. The central bore which extends through the bonnet and receives the valve stem 21 is enlarged at the lower end of the bonnet and forms an extension of the valve chamber 11 for accommodating the gate assembly 15. The flat end surface 25 of the bonnet is superimposed against the flat annular surface 26 of the valve body when the bonnet is in bolted engagement atop the valve body 10.

As shown in FIG. 1, the unique metal sealing ring 40 of this invention is installed at the joint between the bonnet 22 and the valve body 10 to effect a fluid-tight seal under all pressure conditions. For purposes of clarity the sealing ring 40 is shown installed between the valve bonnet 22 and the valve body 10 in the condition wherein the bonnet and valve body are not bolted tightly together. It will be seen that the bonnet 22 is provided with an internal groove in its axial bore at the lower end thereof which provides for an internal inward facing cylindrical surface 41 which extends from the lower planar surface 25 of the bonnet and terminates at an annular radial shoulder 43. In similar fashion the upper end of the valve body 10 is provided with an internal groove opening into the valve chamber 11 and providing an inward facing annular cylindrical surface 42 which extends downwardly from the upper end surface 26 of the valve body 10 and terminates at an upward facing radial extending annular shoulder 44. The cylindrical surface 42 is equal in diameter to the surface 41 in the bonnet 22 and in the assembly of the valve is disposed coaxial therewith.

The seal member 40 of the invention is a ring having upper and lower annular surfaces 56 and 54, respectively. Its inner periphery is defined by a cylindrical surface 63 of a diameter corresponding to that of the inner bore surfaces 64, 65 of the bonnet and valve body bores, respectively. The external peripheral surface of the ring is defined by a pair of circumferential projections 67 and 68 which are separated by a channel or groove 69 therebetween. The surfaces of the annular projections 67, 68 are rounded such that in radial cross section the surfaces are defined by an arc of a circle with a radius of curvature r. The channel or groove 69 between the projections 67, 68 is provided with a corresponding equal radius of curvature. The external diameter of the ring 40, which corresponds to the largest diameter of the two equal projections 67, 68, exceeds the internal diameter of the cylindrical surfaces 41, 42 in the bonnet and valve body, respectively, by approximately 0.0004 inches so that there is an interference fit therebetween. In assembly of the valve, the ring 40 can be installed in the groove in the upper end of the valve body 10 by simply pushing it in by hand. The bonnet 22 is then slipped over the ring 40 with correspondingly little effort.

The axial dimension of the ring 40 slightly exceeds the sum of the axial dimensions of the bonnet and valve body grooves corresponding to the dimensions of the cylindrical surfaces 41, 42. Accordingly, when the bonnet 22 is tightly bolted to the valve body, there is no axial compression or axial loading of the ring 40. In addition, because of the interference fit of the ring 40, the surfaces of the projections 67, 68 provide an initial seal at very low pressures.

Figure 2:
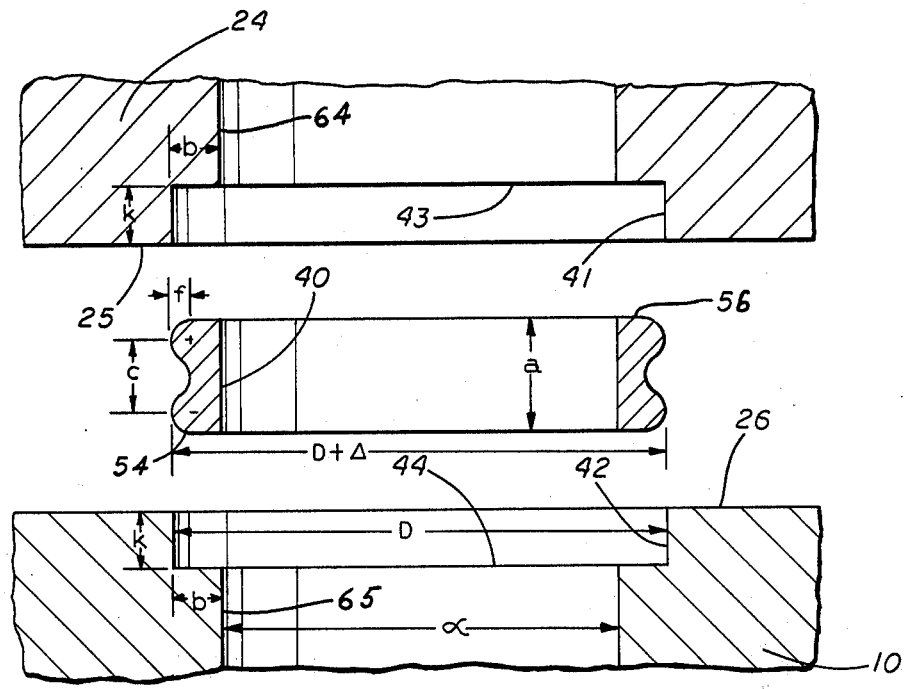
FIG. 2 is an exploded detailed cross-sectional view of the seal ring member of the present invention and its relationship with the valve members shown in FIG. 1 prior to bolting of the valve bonnet to the valve body.
Figure 3:
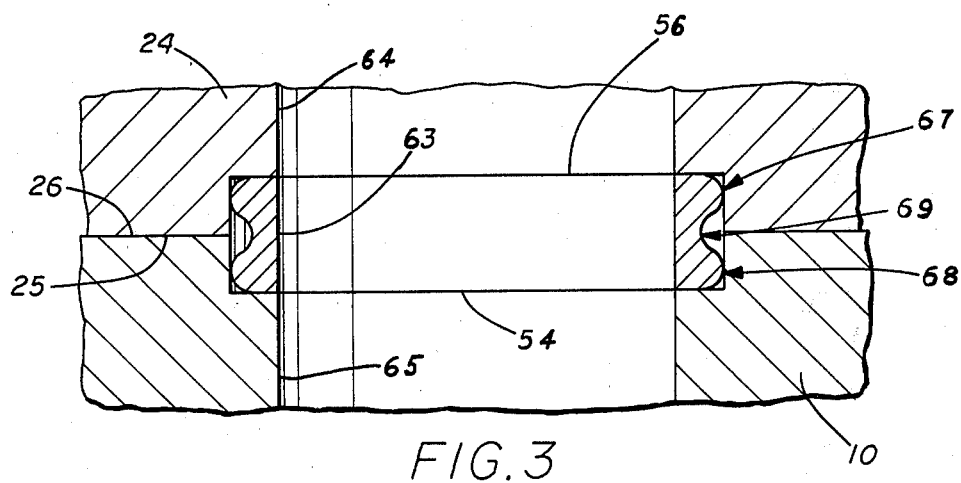
FIG. 3 is a detailed cross-sectional view of the seal ring member of the invention and its relationship with a pair of coaxially aligned tubular members such as the valve bonnet and valve body of FIG. 1 and showing the seal ring member in the condition of effecting a fluid-tight seal therebetween.

For purposes of illustration and ease of description, the significant dimensions of the sealing ring 40 and the seat pockets represented by the recesses in the bonnet 22 and the valve body 10 are identified in FIG. 2. These are listed below:

D = diameter of recess or seat pocket
b = width of seat pocket
K = axial depth of seat pocket
c = distance between centers of curvature of projections 67 and 68
f = radius of curvature of projections 67, 68
a = thickness of seal ring 40
r = radius of curvature of channel 69
Δ = increment by which diameter of seal ring exceeds diameter of seat pocket In the design of the seal ring 40 and the pressure energized sealing connection of this invention, it is important that certain relationships between these dimensions be rigidly adhered to for construction of an effective bore seal connection. These relationships are as follows:

a = 3b to 5b
c = 0.6a
f = 0.1a to 0.2a
K = 1.01a/2
Δ = 0.0002D to 0.0005D $$r = \frac{(\frac{1}{2}c)^2 - f^2}{2f}$$

It is therefore to be noted that the axial thickness of the ring 40 should be in the range of three to five times the width of the seat pocket. Also, for establishing an interference fit between the sealing ring 40 and the bonnet and valve body, the largest external diameter of the seal ring should exceed the diameter of the seat pockets by an amount in the range of 0.0002 to 0.0005 times the diameter of the seat pocket.

It will thus be seen that the bore sealing connection of this invention is constructed and based on the unsupported area principle. When the valve cavity or the bores of the coaxially aligned members, whatever be their nature, are pressurized there is pressure energization of the sealing ring 40 and the ring 40 is compressed in the radial direction rather than the axial direction. This results in a fluid-tight seal, the effectiveness of which increases with increasing fluid pressure. The compression of the seal ring 40 enlarges the contact surface of the ring 40 with the cylindrical wall of the seat pocket so that a narrow annular band of sealing contact area is established between each ring projection 67, 68 and the bonnet and valve body, respectively. Obviously, with increasing fluid pressures and greater pressure energization of the sealing ring, these bands of sealing contact area are enlarged. Although there is a permanent deformation of the sealing ring 40 at these bands of contact, the sealing ring is still reuseable for all applications. The interference fit of the ring 40 may not be as pronounced as in its first application, but some interference will still be present to provide an initial seal at very low pressures.

The material needed for the sealing ring is dictated by the environment in which the seal is to perform and also by the maximum expected contact pressure between the seal ring and the connected aligned members. The maximum contact pressure should never exceed three times the yield strength of the ring material. Accordingly, a ring material is to be selected which has sufficient yield strength to accommodate the maximum expected contact pressure. Maximum contact pressure $P_{max}$ is determined by formula $$P_{max} = \frac{F}{2 b' L \pi}$$

where
F = total fluid force acting on the interior of ring 40
L = length of sealing contact area of ring with cylindrical wall of seat pocket (corresponds to circumference of ring 40)
b' = annular area of sealing contact where $$b' = \left[ \frac{2 F [(1 - \mu_1^2)/E_1 + (1 - \mu_2^2)/E_2]}{\pi L \, 1/d_1} \right]^{\frac{1}{2}}$$

In the formula for determining b':
$\mu_1$ = coefficient of friction of sealing ring
$\mu_2$ = coefficient of friction of the coaxially aligned member (22 or 10)
$E_1$ = Young's Modulus of seal ring material
$E_2$ = Young's Modulus of the material for member (22 or 10)
$d_1$ = twice the radius of curvature of a projection 67 or 68

In view of the above noted limitations, it is apparent that for expected fluid pressures up to 5,000 p.s.i., rubber or plastic material could be used for the sealing ring 40. For higher pressures or for hydrogen sulfide environments, a stainless steel such as Nitronic 60 or a heat treated low carbon steel such as 4140 steel with a hardness of RC22 would be more suitable.

It is also to be noted, in view of the interference fit of the sealing ring 40 and the feature that the axial dimension of the ring 40 closely approximates the distance between the radial shoulders 43, 44, there is no problem with alignment of the sealing ring and the coaxial adjoined members. Further, since the inner diameter of the sealing ring corresponds to that of the bores of the coaxial adjoined members, there is no turbulence produced by fluid flow through the connection and the erosion and corrosion commonly associated with turbulence is eliminated. The sealing connection of this invention can be manufactured economically and is extremely simple to install and replace. Since no gasket loading is necessary, relatively small bonnet bolts can be used resulting in a smaller required bonnet size and a smaller and cheaper valve in valve applications.

It is to be understood that the foregoing description of a preferred embodiment of the invention has been presented for purposes of illustration and description and is not intended to limit the invention to the precise form disclosed. For example, while the sealing ring 40 has been described as having a pair of annular sealing projections 67, 68, it could have a plurality of such projections. However, to avoid contact of a projection with the circular intersection of the coaxially aligned members, which could lead to damage to the sealing ring as would effect its sealing capability and reuseability and also to alignment problems, it is important that only an even number of such circumferential projections be provided. Furthermore, while the invention has been illustrated as part of a gate valve connection, it is also suitable for use in a variety of applications such as a high pressure connection in a wellhead assembly or in pipelines generally. It is to be appreciated therefore, that changes may be made by those skilled in the art to suit particular applications of the invention without departing from the spirit of the invention.

What is claimed is:

1. A pressure energizable sealing connection for sealing between connected first and second coaxially aligned members which are provided with central bores and are subjectable to high fluid pressures therein, said first and second aligned members being each provided with an internal annular recess at the end thereof which is connected adjacent to the other of said members, each said recess of a given one of said first and second aligned members being defined by an internal cylindrical surface extending from the adjoined end of said one member and terminating at an annular radial shoulder formed by an enlargement of the bore of said one member;

a sealing ring for sealing between said connected coaxially aligned members when positioned in said recesses in coaxial alignment therewith, said sealing ring having an external diameter which exceeds the diameters of said recesses of the coaxially aligned members and upper and lower annular end surfaces which reside in planes transverse to the axis of the sealing ring, said sealing ring having a pair of circumferential projections for sealing with the cylindrical sealing surfaces of the coaxially adjoined members, said circumferential projections being separated by a continuous circumferential groove and each of said projections having an arcuate external surface in radial cross section, said ring having an axial dimension which is slightly less than the sum of the axial dimensions of said internal recesses and an external diameter at its circumferential projections which slightly exceeds the diameter of said internal recesses to provide an interference fit of the sealing ring in said recesses and an initial seal with the axial connected members at very low internal fluid pressures, said ring being pressure energizable by fluid pressure internally of said connected first and second coaxially aligned members and subject to being radially compressed thereby for effecting a bore seal with said first and second coaxially aligned members which increases in sealing effectiveness with increasing internal fluid pressure.

2. A pressure energizable sealing connection as recited in claim 1 wherein said circumferential projections are separated by a circumferential groove having a surface with a radius of curvature equal to that of a radial cross-section of said circumferential projections.

3. A pressure energizable sealing connection as recited in claim 1 wherein the axial depth of each said internal annular recess is in accordance with the formula $$K = \frac{1.01a}{2}$$

wherein
K = axial depth of the internal recess
a = axial dimension of the seat ring and the radius of curvature of said groove corresponds to the formula $$r = \frac{(\frac{1}{2}c)^2 - f^2}{2f}$$

where
r = radius of curvature of the groove
c = distance between the centers of curvature of the circumferential projections and
f = radius of curvature of the circumferential projections.

4. A pressure energizable sealing connection as recited in claim 1 wherein the external periphery of the sealing ring is comprised entirely of arcuate surfaces.

5. A pressure energizable sealing connection as recited in claim 1 wherein said sealing ring is provided with a plurality of pairs of said circumferential projections.

6. A sealing ring member for establishing a bore seal between first and second centrally bored members connected end to end in coaxial alignment and having opposed planar surfaces at their adjoining ends, said first and second coaxially aligned and connected members being each provided with an internal annular recess at the end thereof which is connected in engagement with the other of said members, each said recess of a given one of said first and second members being defined by an internal cylindrical sealing surface extending from the adjoined end of said one member, said sealing ring member having at least one pair of circumferential projections for sealing with the cylindrical sealing surfaces of the coaxially adjoined members, said circumferential projections of each pair separated by a circumferential groove and each of said projections having an arcuate external surface in radial cross section, said ring having an axial dimension which is slightly less than the sum of the axial dimensions of said internal recesses and an external diameter at its circumferential projections which slightly exceeds the diameter of said internal recesses whereby said sealing ring member is adapted to be received by an interference fit in said recesses to thereby provide an initial seal with the coaxial connected members at very low internal fluid pressures and said sealing ring member is pressure energizable by fluid pressure internally of said connected first and second coaxially aligned members and subject to being radially compressed thereby for effecting a bore seal with said first and second coaxially aligned members.

7. A sealing ring member as recited in claim 4 wherein said circumferential projections are separated by a circumferential groove having a surface with a radius of curvature equal to that of a radial cross section of said circumferential projections.

8. A sealing ring member as recited in claim 4 wherein said sealing ring member is provided with more than one pair of circumferential projections and the external periphery thereof is comprised entirely of arcuate surfaces.

9. A pressure energizable sealing connection as recited in claim 1 wherein said first and second coaxially aligned members are the bonnet and valve body, respectively, of a high pressure valve.

* * * * *